(12) United States Patent
Sanger et al.

(10) Patent No.: US 7,088,469 B1
(45) Date of Patent: Aug. 8, 2006

(54) METHOD AND APPARATUS FOR PRINTING HALFTONE RECIPE COLOR IMAGES

(75) Inventors: Kurt M. Sanger, Rochester, NY (US); Mitchell S. Burberry, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/535,671

(22) Filed: Mar. 23, 2000

(51) Int. Cl.
*H04N 1/46* (2006.01)

(52) U.S. Cl. .................. 358/1.9; 358/1.1; 358/1.8; 358/501; 358/534; 347/175; 347/187

(58) Field of Classification Search .............. 358/1.9, 358/1.1, 1.8, 500, 501, 515, 518, 534; 347/171, 347/172, 175, 186, 187
See application file for complete search history.

(56) References Cited

U.S. PATENT DOCUMENTS

| 5,132,701 | A | * | 7/1992 | Stephenson et al. ........ 347/176 |
| 5,140,341 | A | * | 8/1992 | Fiscella et al. ............. 347/176 |
| 5,196,863 | A | * | 3/1993 | Palmer et al. .............. 347/171 |
| 5,268,708 | A | | 12/1993 | Harshbarger et al. |
| 5,309,246 | A | | 5/1994 | Barry et al. |
| 5,711,226 | A | * | 1/1998 | Harry et al. ................ 101/488 |
| 5,743,664 | A | * | 4/1998 | Small ......................... 400/249 |
| 5,751,601 | A | * | 5/1998 | Tang et al. ................. 702/104 |
| 6,623,095 | B1 | * | 9/2003 | Ward et al. .................... 347/19 |

* cited by examiner

*Primary Examiner*—Thomas D. Lee
(74) *Attorney, Agent, or Firm*—Nelson Adrian Blish

(57) ABSTRACT

An apparatus for printing halftone recipe color images which comprises a printhead (500). The printhead (500) prints a first color (800) at a first intensity. The printhead (500) prints a second color (802) at a second intensity. The first and second colors (800, 802) are superimposed and coextensive.

18 Claims, 15 Drawing Sheets

Recipe Color Example  ← 680

690 → Recipe Color Example  }— 680
700 ⟋

METHOD AND APPARATUS FOR PRINTING HALFTONE RECIPE COLOR IMAGES

FIELD OF THE INVENTION

This invention relates in general to printing color images and in particular to printing halftone color images in a wide variety of recipe colors.

BACKGROUND OF THE INVENTION

Pre-press color proofing is a procedure used by the printing industry to create representative images of printed material. This procedure avoids the high cost and time required to produce printing plates and set-up a high-speed, high-volume printing press to produce a single intended image for proofing prior to a production run of the intended image. In the absence of pre-press proofing, a production run may require several corrections to the intended image to satisfy customer requirements, and each of the intended images would require a new set of printing plates. By utilizing pre-press color proofing, time and money are saved.

A laser thermal printer having halftone color proofing capabilities is disclosed in commonly assigned U.S. Pat. No. 5,268,708 titled "Laser Thermal Printer With An Automatic Material Supply," issued Dec. 7, 1993 in the name of R. Jack Harshbarger, et al. The Harshbarger, et al. device is capable of forming an image on a sheet of thermal print media by transferring dye from dye donor material to thermal print media. This is achieved by applying thermal energy to the dye donor material to form an image on the thermal print media. The apparatus disclosed comprises a material supply assembly; a lathe bed scanning subsystem, which includes a lathe bed scanning frame, a translation drive, a translation stage member, and a laser printhead; a rotatable vacuum imaging drum; and exit transports for the thermal print media and dye donor material.

The Harshbarger, et al. apparatus meters a length of the thermal print media in roll form from a material supply assembly. The thermal print media is measured and cut into sheets of the required length, transported to the vacuum imaging drum, and wrapped around and secured to the vacuum imaging drum. Donor roll material is metered out of the material supply assembly, measured, and cut into sheets of the required length. A sheet of dye donor material is transported to and wrapped around the vacuum imaging drum, and superposed in registration with the thermal print media. The scanning subsystem traverses the printhead axially along the rotating vacuum imaging drum to produce the image on the thermal print media. The image is written in a single swath, traced out in a continuous spiral, concentric with the imaging drum, as the printhead is moved parallel to the drum axis.

The Harshbarger et al. apparatus simulates the printing process by imaging the dye donor material at a constant exposure. The dye donor is used to mark or not mark the thermal print media similar to the printing process, which either transfers or does not transfer ink. The apparatus allows the exposure to each dye donor material to be varied over a limited range to allow the customer to match the density of the of the dye deposited on the thermal print media with the density of the ink which will be used to print the image on a press.

Although the printer disclosed in the Harshbarger, et al. performs well, there is a long-felt need to be able to use colors other than the standard cyan, magenta, yellow, and black (CMYK) in pre-press color proofing. The CMYK colors are often referred to as process colors. In the printing industry additional colors, other than cyan, magenta, and yellow, are used depending upon the graphic designers intentions for the printed work. A "key" color may be added to highlight a particular component of the artwork. For screened continuous tone images this key color is typically chosen to be black. The image is modified to use black to adjust the intensity level within the image instead of using cyan, magenta, and yellow together. This is called under color removal. For some work, the customer may choose to use another color, for example, brown, as the key color. This may be appropriate, for example, on a cereal box or in an image with a tan subject. To print the job the printer uses cyan, magenta, yellow and the key color. To save money one or more of the colors may be eliminated. For artwork the printing industry may print the job with the exact inks used by the artist. In these cases the printer may be printing red, blue, or some combination of colors which may or may not include CMYK.

In many cases the color of the subject may not be successfully reproduced using the standard CMYK colorants. In this case an additional color printing plate may be created to be printed with an ink which is a close match to the desired color of the subject. This additional color is imaged with the CMYK layers and is called a "bump" plate. It is important to note that one or more of the process colors may be eliminated or replaced with the bump color. For instance if a red color is used to bump the color of a red car, then the black or cyan process color may be replaced with the red bump color.

In existing pre-press systems, additional donor colors would be needed to accomplish this. For example, commercial systems such as Polaroid Graphics Imaging Polaproof, Dupont Digital Halftone Proofing System, and Imation Matchprint Laser Proof Technology, have all advertised the availability of additional donor colorants to create digital halftone proofs with special colors. This solution, however, requires the manufacturer to produce additional dye donor sheet in special color, often in small volume. Small production runs like this, for one color, are expensive.

Another problem arises when plates in the printing press are out of register. In that case colors are imaged slightly wider and overlapped 440, as shown in FIG. 1, so that a white space error 450, shown in FIG. 2, does not occur. FIG. 2 illustrates an error in alignment between the Kodak Yellow (PMS 123C) 410, and Kodak Red (PMS 485C) 402, color planes, which results in a white space error 450 between the two colors. The printing industry hides this defect by increasing the line width of a color such that errors in color placement are hidden behind the darker color. For example, in FIG. 1, the Kodak Yellow 410 is enlarged to expand behind Kodak Red 402, creating a darker outline 440. This technique is called "trapping." It is important to be able to see the trapping on each of the printed color planes in the halftone proof. The capability to show trapping is not readily available in state of the art pre-press color proofers without use of a special color dye donor sheet.

Printing presses traditionally uses a halftone screen to generate a tone scale. The printing process is only capable of delivering or not delivering ink, which is usually opaque. This is the binary printing process. To generate a light tint, small dots of ink are used. To generate a darker tint the ink dots are enlarged which touch and fill the space between dots. The halftone proofer disclosed in U.S. Pat. No. 5,268,708 images CMYK colorants at a high resolution. For example, a Kodak Approval XP system produces images at either 2400 dpi or 2540 dpi using a software Raster Image Processor (RIP) to generate a bitmap which determines when the lasers within the printer mark the CMYK films. FIGS. 3, 4, and 5 demonstrate how a halftone image would look at different magnifications. Tone scale is composed of colored dots which are shown in the exploded views in FIGS. 4 and 5. The colors are arranged in a grid and the pitch, dot to dot, is called the screen ruling in dots per inch. The angle of the grid is called the screen angle. Each color is printed at a different screen angle to hide the beating, or aliasing, caused by the alignment and accuracy of the color screens to each other. For optimum conditions the cyan, magenta, and black screens are each separated by 30 degrees. The fourth color, yellow, is then placed at an angle half way between the angle of two of the other colors. In FIGS. 4 and 5 yellow is between the cyan and magenta screens.

The color screens are separated out as planes 630, 640, 650, and 660 in FIG. 6. Cyan plane 630, with a grid 670 superimposed over the halftone dots 631 are comprised of micropixels 632 as shown in FIG. 7. The software RIP determines the positions in the grid when the laser needs to be energized to print the halftone dot. While only cyan plane 630 is shown, a similar computation is performed for the magenta plane 640, the yellow plane 650, and the black plane 660.

It is common practice in color proofing to represent special color planes, i.e. planes containing colors other than the processes colors, by replacing solid color areas with halftone patterns of the process colors as described for example in U.S. Pat. No. 5,309,246. It is usually necessary to attach additional instructions with these proofs to inform customers and printers that a substitution has been made. It is highly desirable for halftone color proofing systems to reproduce the special color planes with colors that more closely represent the final print job. In the case of laser thermal material transfer proofing systems it is well known that this can be accomplished by using individualized donors having the unique color required for the special color plane, however, this process adds additional expense as described above.

FIGS. 8, 9, and 10 demonstrates how the Kodak corporate logo would look at different magnification using conventional halftone screens to approximate Kodak Yellow and Kodak Red inks. FIGS. 9 and 10 are exploded views of the halftone screening near the Kodak "K." Without special donor colors to image Kodak Yellow and Kodak Red a digital halftone printer can only approximate the finished image that will be printed on press. Also, as shown in FIG. 10, the trapping between colors cannot be clearly shown. A customer may choose either to convert these special colors to process colors, CMYK, and use halftone screens to approximate the color, or may choose to leave these features off the proof. Neither of these solutions is acceptable.

SUMMARY OF THE INVENTION

It is the object of the present invention to provide a method and apparatus for printing specialty color images having a color plane that is not a standard CMYK process color. It is also an object of this invention to provide a method and apparatus for printing a specialty color image using a special color plane in addition to any combination of the CMYK process colors. It is also an object of the present invention to provide a method and apparatus for showing trapping using special colors. Yet another object is to print specialty colors using a halftone color printer.

According to one aspect of the present invention an apparatus for printing halftone recipe color images comprises a printhead which prints a first color at a first intensity. A second color is printed at a second intensity and the second color is superimposed and coextensive on top of the first color to produce a recipe color, to create a specialty color on a digital pre-press proof. In one embodiment a third color at a third intensity is superimposed on the first and second color.

It is an advantage of the present invention that the interaction between the recipe color and the other colors used in the job may be shown.

It is an advantage of the present invention that additional colors besides the CMYK process colors, such as orange and green, may also be used in the recipe color.

It is an advantage of the present invention that process colors may be added to a pigmented donor to tint the pigmented color.

It is an advantage of the present invention that a recipe color may be used to represent a process color. This allows changing the color of each process color to an exact match of the ink which will be used to image the job on press. The color match of a proofing system that matches the ink is superior to other proofing systems.

It is an advantage of the present invention that the same donor used for a process color plane may be used in a recipe color, saving the customer donor sheets within a job.

It is an advantage of the present invention that any color within the color space of the apparatus may be created by mixing the available colors together in varying amounts. This alleviates the need for the customer to purchase a special colored donor sheet for each color that she desires.

It is an advantage of the present invention that manufacturers do not have to create, manufacture, store and sell discrete color rolls for each color that the customer desires.

It is an advantage of the present invention that a unique color may be generated to show the customer where the color will be in the printed job even if the color is outside the color gamut of the donors which are in her machine. This unique color will be visibly different from the process colors allowing the customer to determine that the job will be printed properly.

It is an advantage of the present invention that the unique color may be chosen to be the same hue or the same lightness as the desired color, even if it is outside the color gamut of the donors within the machine.

It is an advantage of the present invention that a customer may view a halftone proof with process colors plus the recipe colors which represents a close approximation of the printed job without going to press, creating films, or creating plates.

It is an advantage of the present invention that the trapping between the colors in the job is easily identified.

It is an advantage of the present invention that the customer may use a pigmented donor to be used as both a special color and as part of a recipe color.

It is an advantage of the present invention that the customer may proof only recipe colors instead of or in place of process colors. Jobs consisting of only non-process colors may be proofed from recipe colors.

It is an advantage of the present invention that a stochastic screen may be imaged using a recipe color made with this technique.

It is an advantage of the present invention that for a solid colorant system, such as a pigmented system, pulse width modulation may be used to vary the amount of colorant transferred within the micro-pixel dot to create a recipe color mix.

The invention and its objects and advantages will become more apparent in the detailed description of the preferred embodiment presented below.

DETAILED DESCRIPTION OF THE INVENTION

The present description will be directed in particular to elements forming part of, or cooperating more directly with, an apparatus in accordance with the present invention. It is to be understood that elements not specifically shown or described may take various forms well known to those skilled in the art. While the invention is described below in the environment of a laser thermal printer, it will be noted that the invention can be used with other types of imaging apparatus.

Figure 11:
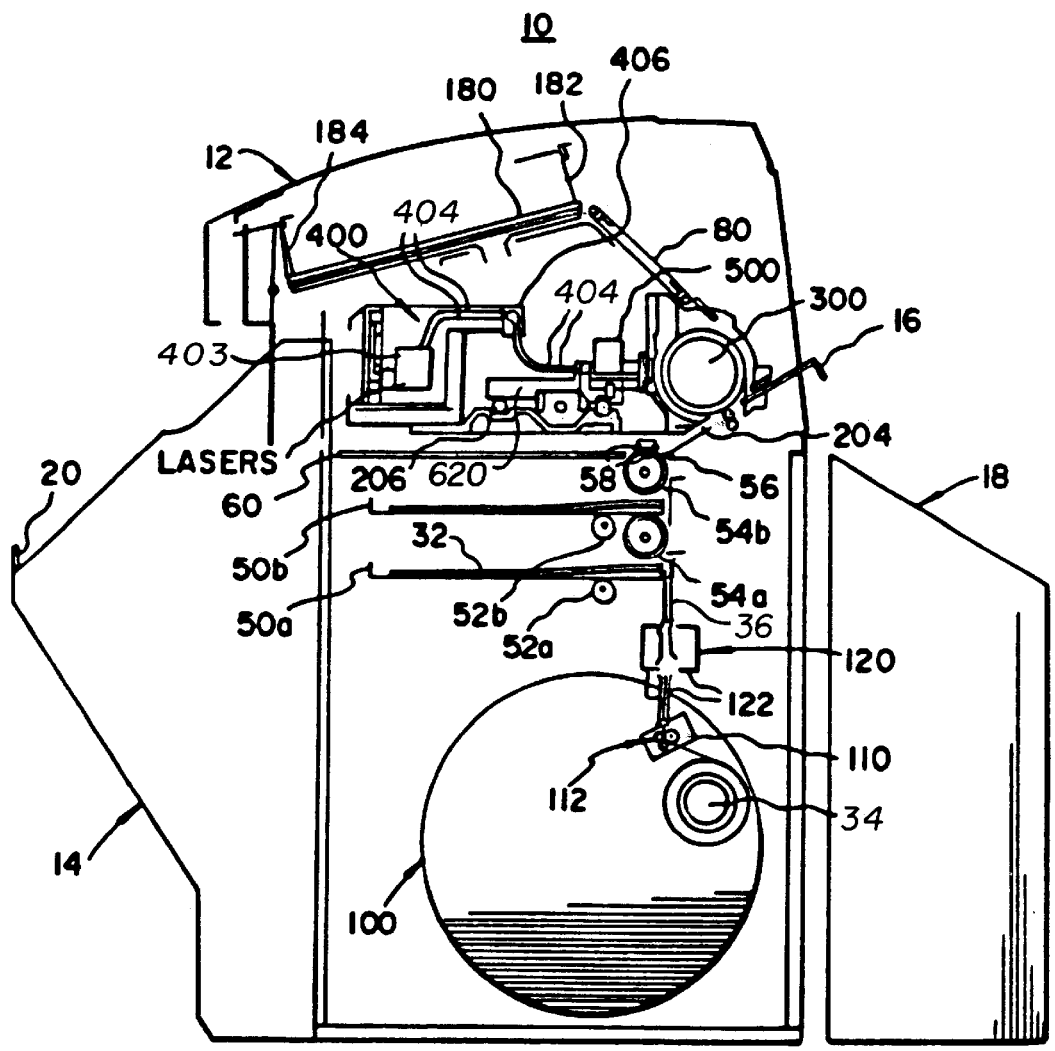
FIG. 11 is a side view, in vertical cross section, of an image processing apparatus according to the present invention.
Figure 12:
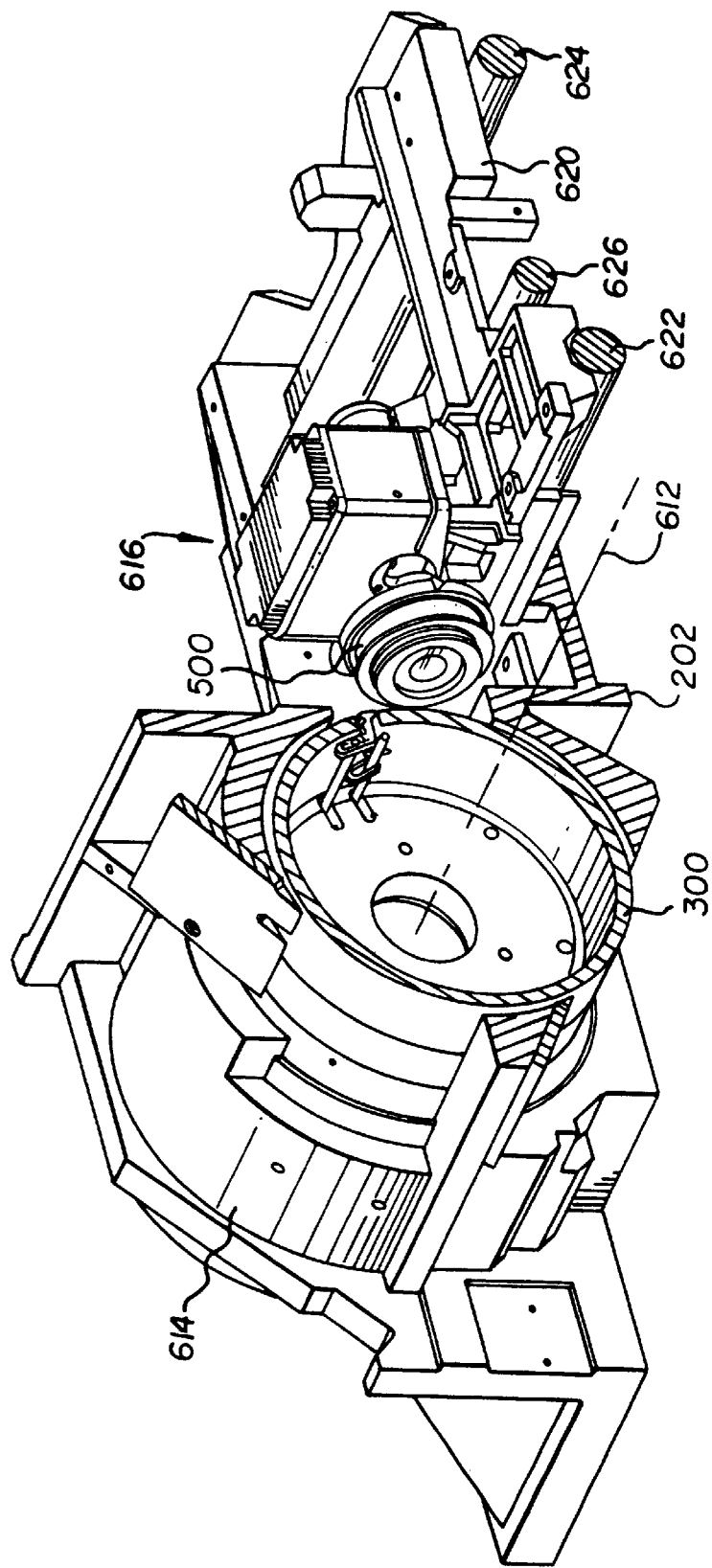
FIG. 12 is a perspective view, partially in cross section, of a vacuum imaging drum and a printhead according to the present invention.

Referring to FIGS. 11 and 12, there is illustrated an image processing apparatus 10 according to the present invention having an image processor housing 12 which provides a protective cover. A movable, hinged image processor door 14 is attached to the front portion of the image processor housing 12, which permits access to the two sheet material trays, lower sheet material tray 50a and upper sheet material tray 50b, which are positioned in the interior portion of the image processor housing 12 to support thermal print media 32. Only one of the sheet material trays will dispense the thermal print media to create an intended image, the alternate sheet material tray either holds an alternative type of thermal print media or functions as a back up sheet material tray. In this regard, the lower sheet material tray 50a includes a lower media lift cam 52a for lifting the lower sheet material tray 50a and ultimately the thermal print media 32, upwardly toward a rotatable, lower media roller 54a and toward a second rotatable, upper media roller 54b which, when both are rotated, permits the thermal print media 32 to be pulled upwardly towards a media guide 56. The upper sheet material tray 50b includes a upper media lift cam 52b for lifting the upper sheet material tray 50b and the thermal print media 32 towards the upper media roller 54b which directs it towards the media guide 56.

The movable media guide 56 directs the thermal print media 32 under a pair of media guide rollers 58 which engages the thermal print media 32 to assist the upper media roller 54b in directing it onto the media staging tray 60. The media guide 56 is attached and hinged to the lathe bed scanning frame 202 at one end, and is uninhibited at its other end for permitting multiple positioning of the media guide 56. The media guide 56 then rotates its uninhibited end downwardly, as illustrated in the position shown, and the direction of rotation of the upper media roller 54b is reversed for moving the thermal print medium receiver sheet material 32 resting on the media staging tray 60 under the pair of media guide rollers 58, upwardly through an entrance passageway 204 and around a rotatable vacuum imaging drum 300.

A roll of dye donor roll material 34 is connected to the media carousel 100 in a lower portion of the image processor housing 12. Four (or more) rolls are used, but only one is shown for clarity. Each roll includes a dye donor roll material of a different color, typically black, yellow, magenta and cyan. The dye donor roll materials are cut into sheets and passed to the vacuum imaging drum 300. A media drive mechanism 110 is attached to each roll of dye donor roll material 34, and includes three media drive rollers 112 through which the dye donor roll material 34 is metered upwardly into a media knife assembly 120. After the dye donor roll material 34 reaches a predetermined position, the media drive rollers 112 cease driving the dye donor roll material 34 and the two media knife blades 122 positioned at the bottom portion of the media knife assembly 120 cut the dye donor roll material 34 into sheets. The lower media roller 54a and the upper media roller 54b along with the media guide 56 then pass the dye donor sheet 36 onto the media staging tray 60 and to the vacuum imaging drum 300 and in registration with the thermal print media 32 using the same process as described above for passing the thermal print media 32 onto the vacuum imaging drum 300. The dye donor sheet 36 rests atop the thermal print media 32 with a narrow gap between the two created by microbeads imbedded in the surface of the thermal print media 32.

A laser assembly 400 includes a quantity of laser diodes 403 in its interior, the laser diodes 403 are connected via fiber optic cables 404 to a distribution block 406 and ultimately to the printhead 500. The printhead 500 directs thermal energy received from the laser diodes 403 causing the dye donor sheet to pass the desired color across a gap to the thermal print media 32. The printhead 500 moves axially along the longitudinal axis of the vacuum imaging drum 300 for transferring the data to create the intended image onto the thermal print media 32.

For writing, the vacuum imaging drum 300 rotates at a constant velocity, and the printhead 500 begins at one end of the thermal print media 32 and traverse the entire length of the thermal print media 32 for completing the transfer process for the particular dye donor sheet resting on the thermal print media 32. After the printhead 500 has completed the transfer process, for the particular dye donor sheet, the dye donor sheet is removed from the vacuum imaging drum 300 and transferred out the image processor housing 12 via a skive or ejection chute 16. The dye donor sheet 36 eventually comes to rest in a waste bin 18 for removal by the user. The process described above is then repeated for the other rolls of dye donor material.

After the color from all four sheets of the dye donor sheets 36 have been transferred and the dye donor sheets 36 have been removed from the vacuum imaging drum 300, the thermal print media 32 is removed from the vacuum imaging drum 300 and transported via a transport mechanism 80 to a color binding assembly 180. The media entrance door 182 of the color binding assembly 180 is opened permitting the thermal print media 32 to enter the color binding assembly 180, and shuts once the thermal print media 32 comes to rest in the color binding assembly 180. The color binding assembly 180 processes the thermal print media 32 for further binding the transferred colors on the thermal print media 32 and for sealing the microbeads thereon. After the color binding process has been completed, the media exit door 184 is opened and the thermal print media 32 with the intended image thereon passes out of the color binding assembly 180 and the image processor housing 12 and comes to rest against a media stop 20.

Referring to FIG. 12, vacuum imaging drum 300 is mounted for rotation about an axis 612 in a drum frame member 614. The imaging drum is adapted to support a thermal print media while dye is transferred from the donor sheet to a receiver sheet as a result of heating the dye in the donor sheet. The donor sheet and the receiver sheet are superposed in intimate contact and are held onto the peripheral surface of the drum by vacuum applied to the superposed elements from the interior of the drum. The donor sheet, when irradiated, converts light energy to heat energy. The dye in the immediate vicinity is heated to its vaporization temperature for transfer to the receiver sheet.

A movable writing head assembly 616 is movably supported adjacent vacuum imaging drum 300, and includes a printhead 500 which is mounted on a translator member 620 which, in turn, is slidably supported on bars 622 and 624, which are parallel to the axis 612 of vacuum imaging drum 300. Translator member 620 is driven by a motor, not shown, which rotates a lead screw 626 parallel to bars 622 and 624 to move printhead 500 parallel to the axis of the drum.

Figure 13:
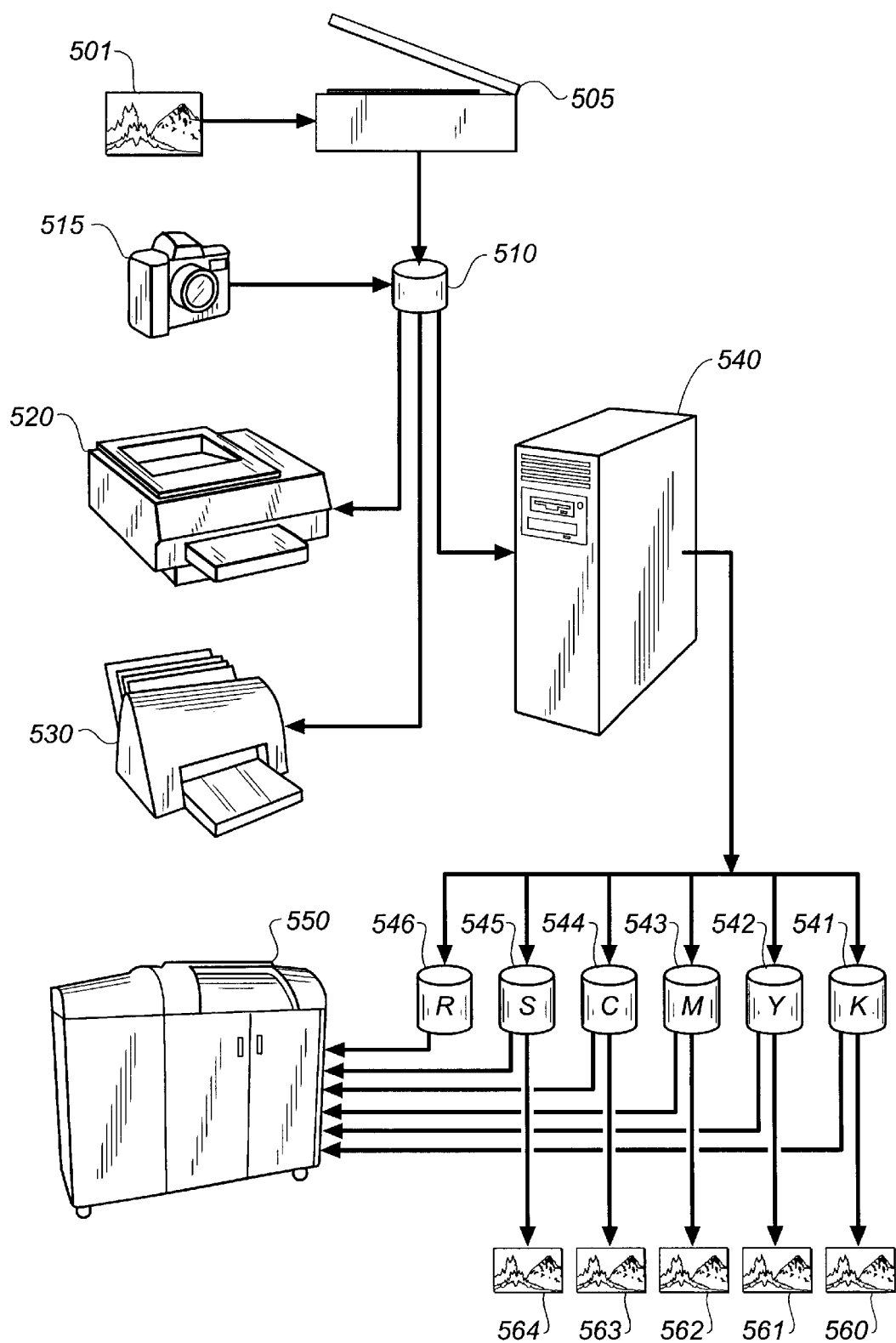
FIG. 13 is a schematic diagram of an apparatus for printing halftone recipe color images according to the present invention.

A schematic of the workflow for this invention is shown in FIG. 13. A customer image 501 is captured as a positive film, negative film, or print. The image is then scanned on a scanner 505 and saved as a digital file 510. The file will have an associated color space such as Red, Green, Blue (RGB), CMYK, or Luminance and Chrominance (L*a*b*), which defines the colors used in each color plane for each pixel. Each pixel in the digital file will also have a bit depth for each color plane such as 8 bits or 12 bits which determines how many unique levels are possible for each pixel. A digital camera 515 may also be used to directly create the digital file 510.

Once the customer has the digital file she may manipulate it using special software. The customer may perform operations such as adding text, cropping, rotating, resizing, changing the color, change the contrast, etc. The customer may also import the image into an illustration program. Using special software the customer may create a logo with portions of real pictures used to texture a surface. The customer may also use page layout software to compose pages containing text, images, and artwork. These operations may be performed with commercially available software. The result is a composite page stored as a digital file 510.

To view this composite file the customer may print it to a thermal printer 520. Software on the printer, or alternatively in a computer, converts the scanned images, artwork, and text to drive the thermal printer. Thermal printers are available with 300 to 600 dpi output resolutions. Commercially available thermal printer uses cyan, magenta, and yellow donors with multiple levels of colorant per pixel. Because the thermal printer allows multiple levels of each color per pixel it is considered a continuous tone device.

The customer may also use a color ink jet printer 530 to view the composite page. Ink jet printers are available with writing resolutions between 300 and 1440 dpi. These printers use multiple dots, multiple dot sizes, dithered or stochastic screens, and multiple ink colors to simulate continuous tone images. Software in a computer or within the printer is used to render the composite page on the ink jet printer. Inkjet printers typically use multiple levels of cyan, multiple levels of magenta, one level of yellow, and one level of black ink to cover the tone range of most images. Ink jet printers may also include orange and green inks, in addition to CMYK, to reproduce high fidelity color. Because the ink jet printer may deposit or not deposit ink it is considered a binary device. An ink jet printer with multiple levels of a single colorant, such as two levels of cyan ink, would be considered a multiple level binary device.

To prepare a halftone color proof using recipe colors according to the present invention, the customer prints a proof on a color digital proofer 550, the operation of which has been described in detail above with respect to FIGS. 11 and 12, to view the composite page. A software RIP running on a personal computer 540 converts the composite page into cyan 544, magenta, 543, yellow 542, and black 541 bitmap files. Bitmap files contain one bit for each pixel. This type of software is available commercially. A typical printer writes at 1800 dpi, although printers which image at either 2400 or 2540 dpi are also available. The RIP outputs the bitmap files at the resolution of the writing device. The RIP converts the images in the digital file 510 to a halftone screen with a screen ruling and screen angle chosen by the customer. The RIP then combines the halftoned images with the artwork, line work, and text into the digital file 510 to create the bitmap files for cyan 544, magenta 543, yellow 542, and black 541. The bitmap files are used by the color digital proofer 550 to image the cyan, magenta, yellow, and black donors.

Art work may consist of scanned images of hand drawings using solid color inks, crayons, and paint; digital images which are created using illustration software; or continuous tone images created using photo editing software. Continuous tone images must be screened using the RIP. Digital files containing line work and text define graphics which are composed of solid colors. These colors are usually special colors which can not be reproduced by using the process colors at their full intensity. For each special color the RIP 540 will create a special color bitmap 545 unless the customer chooses the option to convert the special colors into process colors. To convert to process colors the RIP 540 screens the special color and includes in the process color bitmaps, 541, 542, 543, and 544. If the customer chooses not to convert the process colors, and the special colored donor is not available then the special color will be omitted from the proof leaving a white space on the proof where the special color would normally be printed.

In a printing press the bitmap would be used to create printing plates. Each color requires its own plate. The black color bitmap file 541 is used to create the black color plate 560. The cyan 544, magenta 543, and yellow 542 bitmap files are used to create the cyan 563, magenta 562, and yellow 561 printing plates. If a special color is to be printed then the special color bitmap 545 is required to create the special color printing plate 563. If multiple special colors are to be printed then multiple special color bitmaps and plates are required.

In a printing press the press may deposit ink, or not deposit ink. This is a binary process. The digital halftone proofer 550 simulates this binary process by marking the dye donor film 36 to transfer dye to the thermal print media 32 in a binary manner at the writing resolution of the digital halftone proofer 550. Each writing pass is written using a constant exposure to create a density level of the dye on the thermal print media which is substantially the same as the density level of the ink which will be transferred by the printing press.

If a special color dye donor is available then a bitmap to image that special color dye donor 545 may be used to image the color in the digital halftone proofer 550. If the special color dye is not available, the present invention creates a recipe color from the dye donor colors which are in the machine. The RIP 540 creates the special color bitmap file and saves it as a recipe color bitmap file 546. The digital halftone proofer 550 utilizes the process colors and special colors contained within the media carousel 100. A subset of the media loaded into the machine is imaged using the recipe color bitmap 546. Each dye donor used in the recipe is imaged with the same recipe color bitmap.

In addition to imaging the dye donors 36 contained within the carousel 100, the exposures used to image each dye donor is varied to transfer the desired amount of each colorant. This results in a recipe color plane composed of one or more colorants deposited on the thermal print media 32. By adjusting the exposures for each color used in the recipe, a large number of colors in the color gamut of the dye donors loaded into the machine are obtained, which are different from any of the original dye donor colors.

Figures 14, 15, 16:
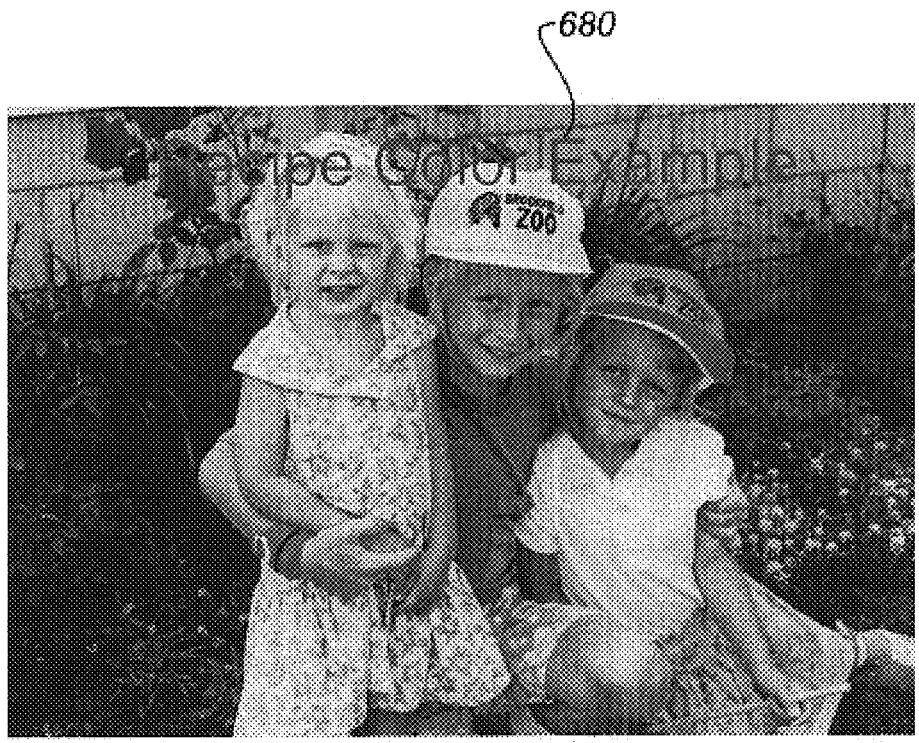
FIG. 14 is a simulated halftone image using recipe colors.
FIG. 15 is an enlarged portion of FIG. 14 showing separation of the color planes used to make recipe colors.
FIG. 16 shows the two color passes required to create the recipe color plane of FIG. 15.

Referring now to FIGS. 14 and 15, a halftone color image is shown using a recipe color in an additional color plane 680. A magenta pass 690, and a yellow pass 700, shown in FIG. 16, are used to create the red recipe color shown in plane 680. To produce the recipe color, the RIP generates one additional bitmap plane for each recipe color. This is shown as the recipe color bitmap 546 in FIG. 13. The same bitmap is used to image magenta pass 690 and yellow pass 700. It is obvious to those skilled in the art to show that a recipe color could be composed with one color. For instance a light or dark magenta. The more common practice, however, would be to compose a recipe with two or more colors. For instance a light gray recipe color may be composed using cyan, magenta, and yellow exposures. Alternatively, a light gray color may be composed using cyan, magenta, yellow, and black.

While the example shows that red text has been added to the image shown in FIG. 14, the same techniques can be used to add a screened red image, or other recipe color, to the process image. This would be the case for imaging a bump plate on top of a process color image to highlight the bump color. Although the example uses process colors in combination with one recipe color, multiple recipe colors may be added to a single image or combination of images. Also, the example uses process colors, however, the customer image may consist of only multiple recipe colors, or one recipe color, or a combination of recipe colors with process colors.

An image, which has been stored as a digital file, is in a continuous tone format, and may be transformed into different colorants other than CMYK, using specialized software. For example, Photospot CT for Photoshop allows the user to create a spot color plane from a three color image. Powertone by Intense Software for Photoshop allows the user to convert a three color image into a duotone image. The printer will then use these other colorants to reproduce the job. To create proofs of these jobs prior to imaging on a high-speed, high volume press currently requires the customer to create films for each color layer and use an analog proofing process such as Dupont Matchprint. If the customer chooses her ink colors to be one of the few donors available in a digital halftone proofing system, she may proof the job using those specialty donors. The Dupont Digital Halftone Proofing System suggests using the digital proof with the process colors, and overlaying an analog proof of the specialty color using Dupont's Waterproof Color Versatility System.

Figure 17:
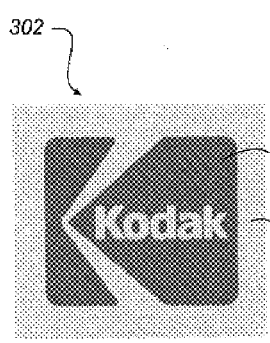
FIG. 17 is a graphic color image using two special colors according to the present invention.
Figure 18:
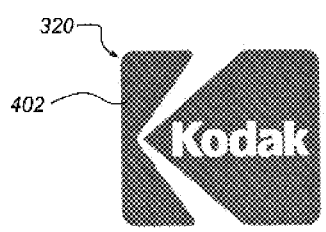
FIG. 18 shows the specialty color for red separated from the graphic image in FIG. 17.
Figure 19:
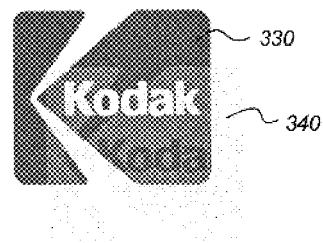
FIG. 19 shows the two color recipe used to form the specialty color plane shown in FIG. 18.
Figure 20:
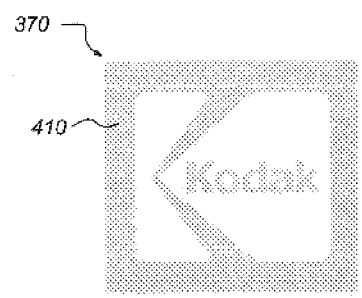
FIG. 20 shows the specialty color yellow separated from the graphic image shown in FIG. 17.
Figure 21:
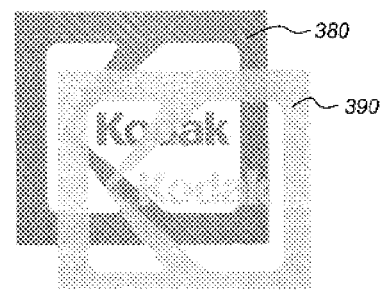
FIG. 21 shows the two color recipe used to form the recipe color shown in FIG. 20.

FIGS. 17–21 further illustrate the present invention. In FIG. 17, two recipe colors are used to image the Kodak Corporate Logo 302. The two recipe colors are Kodak Red 402, and Kodak Yellow 410. The Kodak Red is shown as Recipe color plane 320, in FIG. 18, which is composed of a magenta pass 330 and a light yellow pass 340, shown in FIG. 19. The Kodak Yellow shown as a Recipe color plane 370 in FIG. 20, composed of a light magenta pass 380 and a medium yellow pass 390, shown in FIG. 21.

Figure 22:
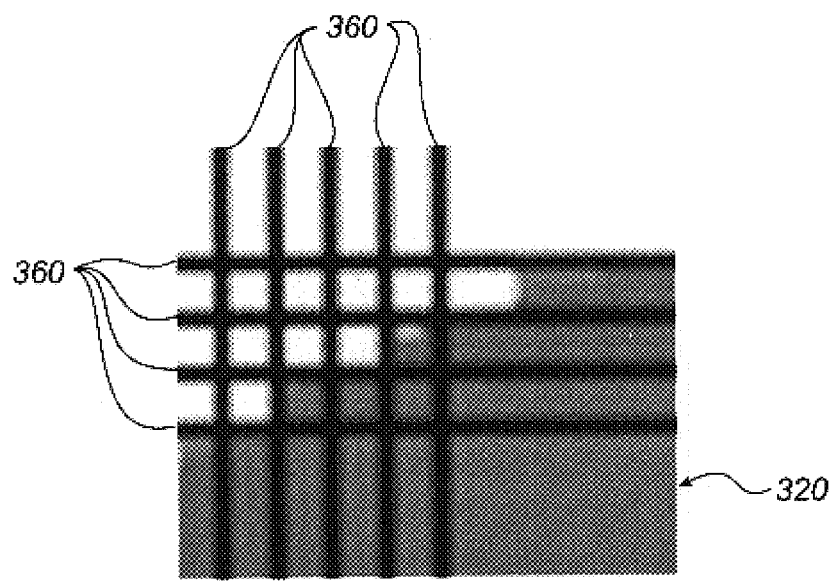
FIG. 22 shows how the RIP generates the bitmap for the special color plane shown in FIG. 18.

For each of the recipe colors the software RIP, produces a bitmap which is used to drive the lasers for the colors in the Recipe Color. For the example in FIGS. 17–21, the recipe color bitmap stored as 546 in FIG. 13 might contain the bitmap for the Kodak Red. Another recipe color bitmap, not shown, is used to store the recipe color bitmap for Kodak Yellow. FIG. 22 shows the grid 360 that the RIP uses to create the bitmap for the Kodak Red recipe color plane 320. The same bitmap is used to image the magenta pass 330 and light yellow pass 340, superimposing both colors on top of each other. The RIP generates another bitmap for the Kodak Yellow Recipe color plane 370, which will be used to image both the light magenta 380 and the medium yellow 390 color passes.

Figure 1:
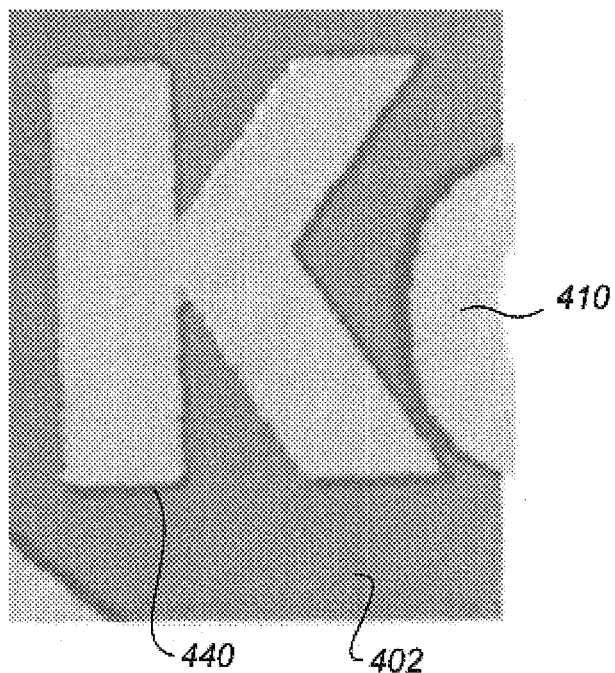
FIG. 1 is a simulation of a graphic image consisting of two special colors imaged using a high resolution imaging device, showing trapping.
Figure 2:
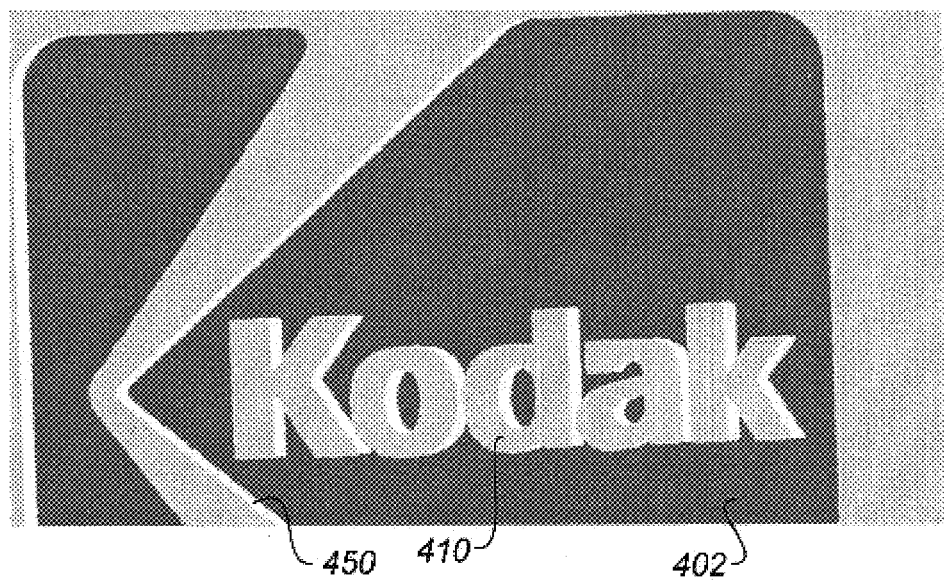
FIG. 2 is a simulation of a graphic image consisting of two special colors imaged using a high resolution imaging device showing white space error.
Figure 3:
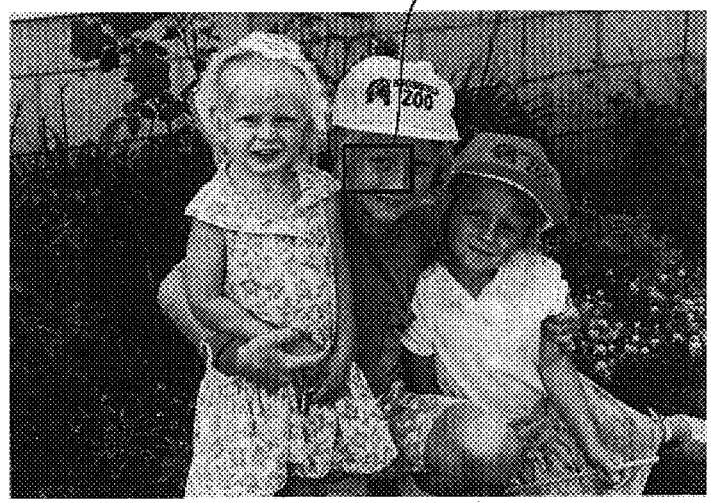
FIG. 3 is a simulation of a halftone image.
Figure 4:
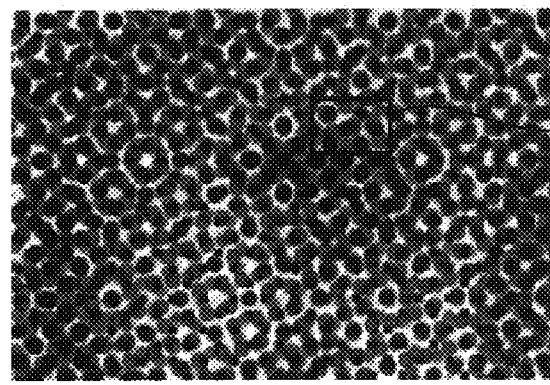
FIG. 4 is a simulation of an enlarged view of a portion of the image shown in FIG. 3.
Figure 5:
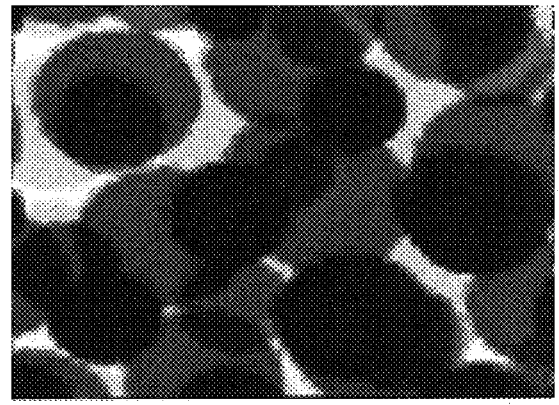
FIG. 5 is an enlarged view of a portion of the image shown in FIG. 4.
Figure 6:
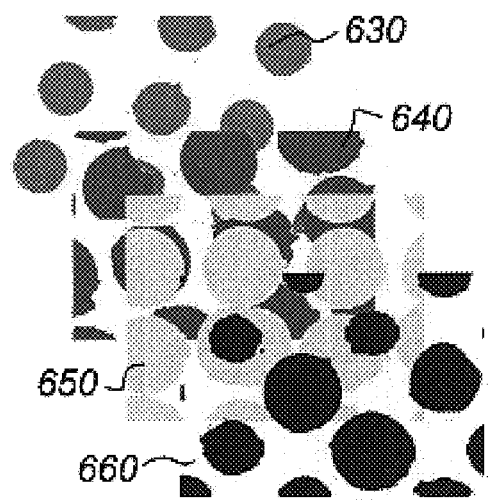
FIG. 6 is an exploded view of the color planes which comprise FIG. 5.
Figure 7:
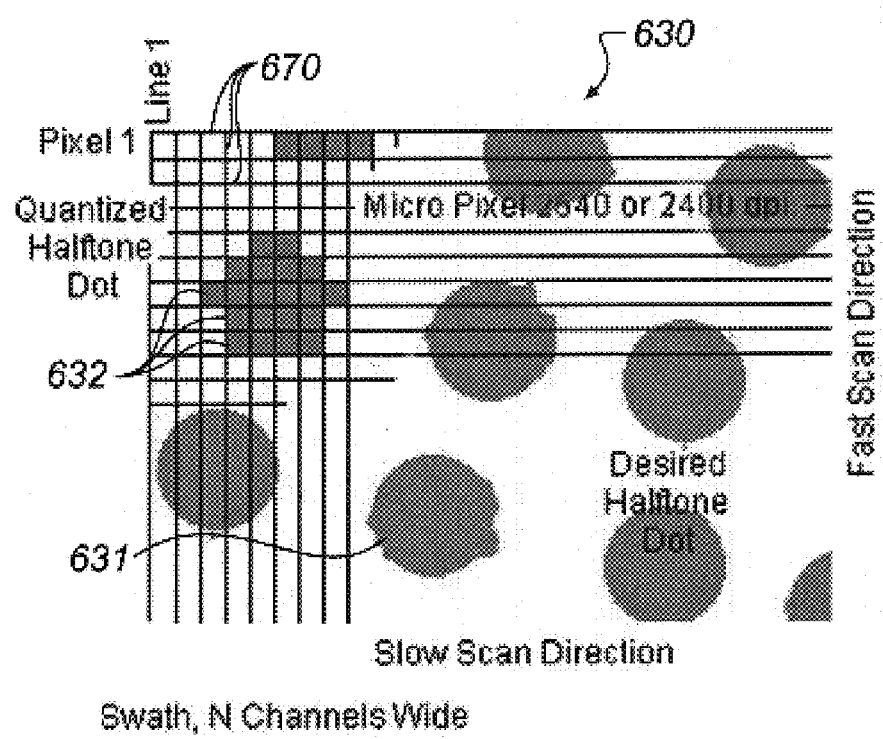
FIG. 7 is an enlarged view of the cyan color plane shown in FIG. 6.
Figure 8:
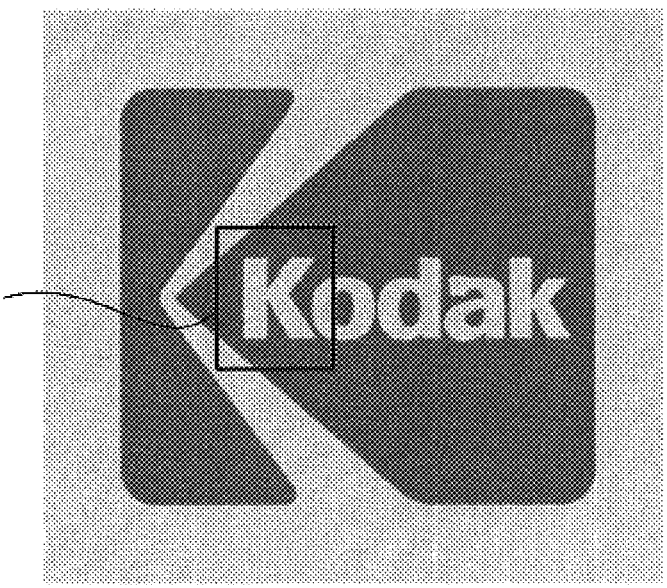
FIG. 8 is a simulated halftone image used to approximate specialty colors.
Figure 9:
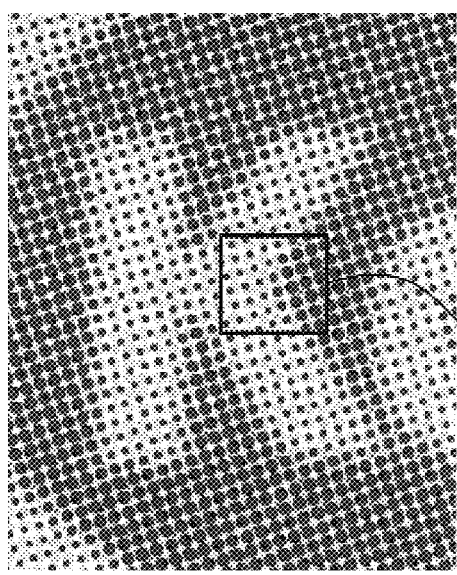
FIG. 9 is an enlarged view of a portion of FIG. 8.
Figure 10:
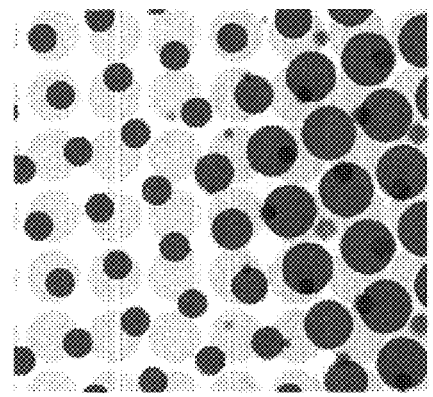
FIG. 10 is an enlarged view of a portion of FIG. 9.

While all of these examples show the use of recipe colors to image a solid graphic special color, one skilled in the art will recognize that the cyan bitmap 544 of FIG. 13, consisting of the micropixels 632 in FIG. 7 which compose the cyan halftone screen 631, may also be imaged as a recipe color. Similarly the magenta 543, yellow 542, and black 541 bitmaps may also be imaged as unique recipe colors.

Figure 23:
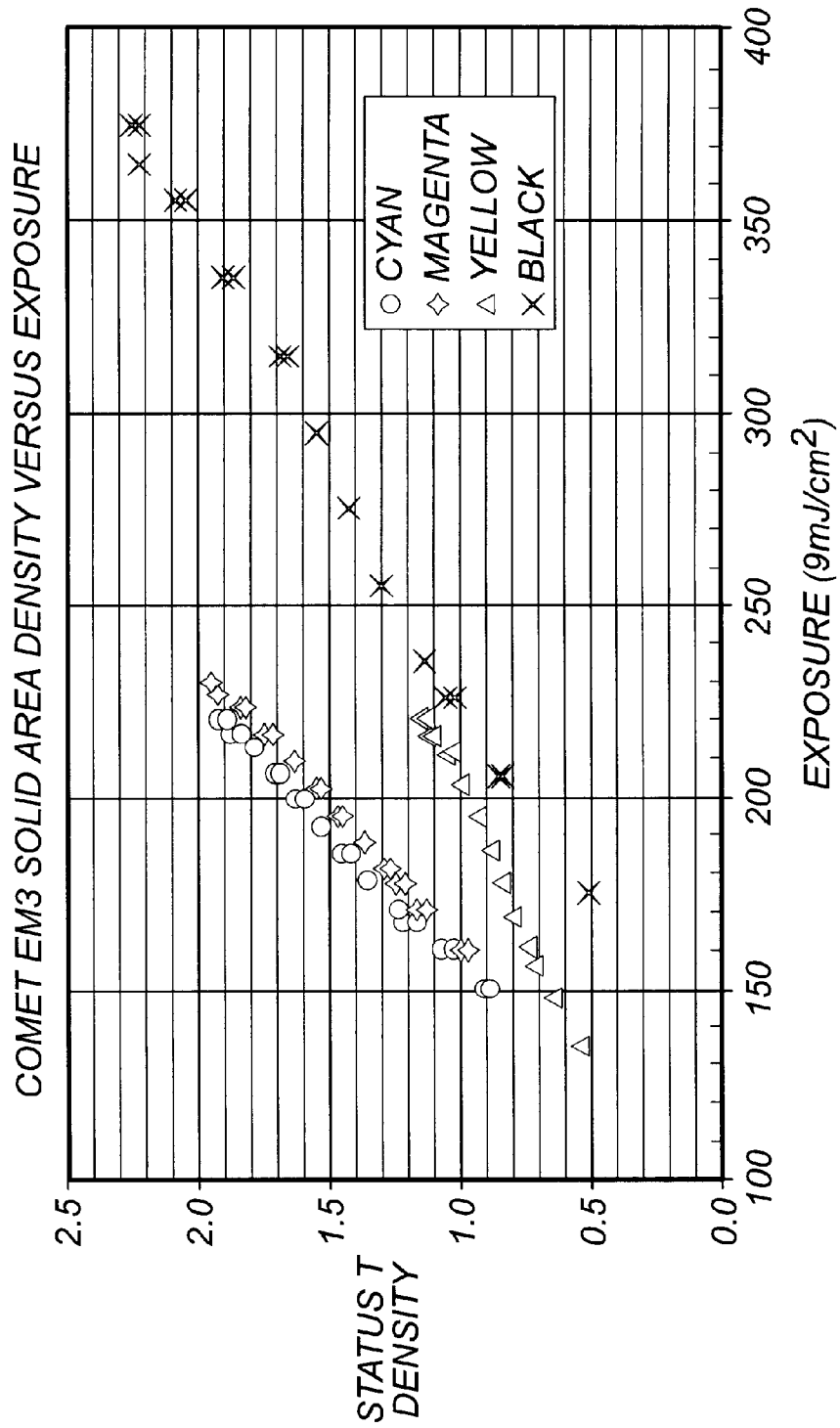
FIG. 23 is a graph of density versus exposure on a four color digital halftone color proofer.

The sensitometric curves of Kodak Approval donors are shown in FIG. 23. FIG. 23 shows the exposures required to obtain a 1.17 cyan, 1.25 magenta, 0.87 yellow, and 1.67 black. These exposures may be typical of the exposures required to image the cyan, magenta, yellow, and black layers at a density level which would be similar to the cyan, magenta, yellow, and black ink density level used on a four color press. FIG. 23 shows that there are other exposures that may be utilized to obtain differing amounts of density from the same cyan, magenta, yellow, and black donors. The present invention changes the exposure of the printer by varying the laser power and or the writing speed of the printer to achieve a density other than the normal density used. This allows mixing differing amounts of color in the same micropixel to achieve another unique color composed of one or more of the original colors.

Another method of changing the exposure is to modulate the laser writing system on a micropixel basis. This is a form of pulse width modulation, which has the same effect as changing laser power or drum speed. The advantage of this type of modulation is apparent when imaging binary colorant donors such as the donors manufactured by Imation and Polaroid. Recipe colors may be created by pulse width modulating the micropixel dot to mix a solid colorant with the paper on a subhalftone dot scale.

Figure 24:
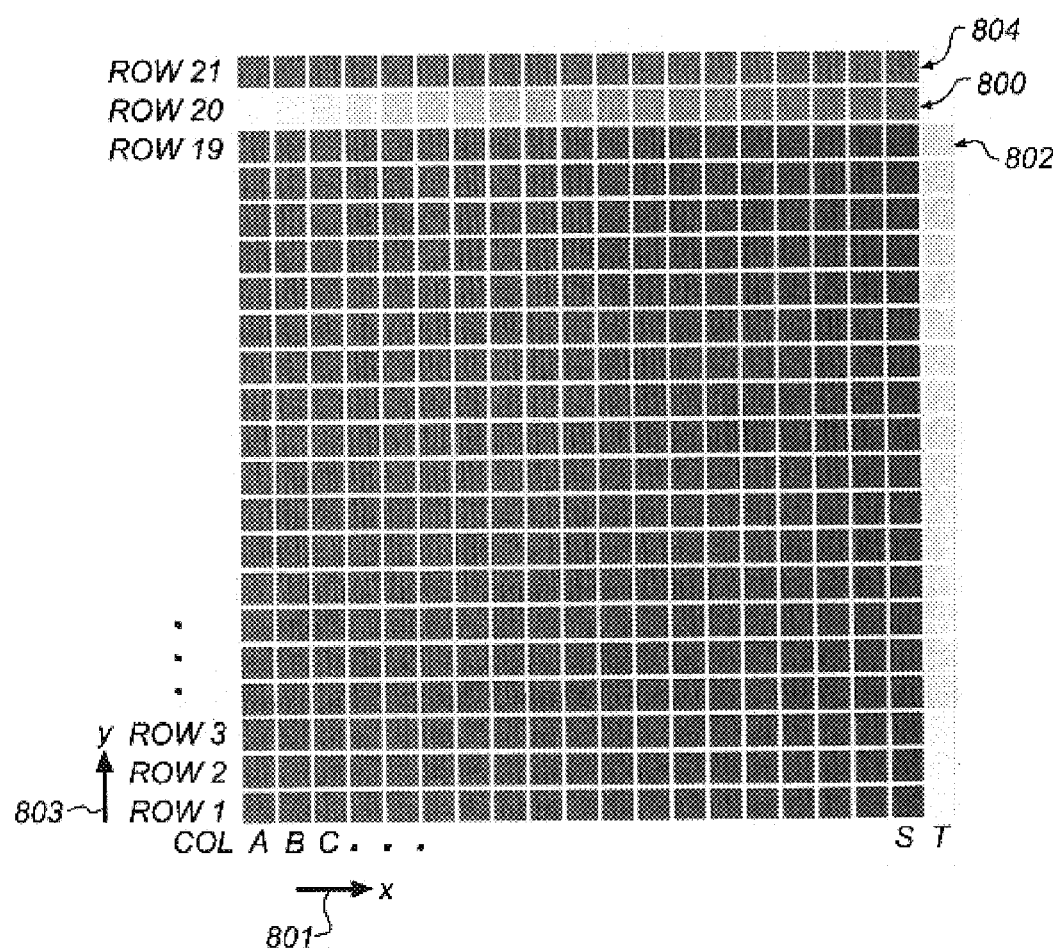
FIG. 24 is a grid of recipe colors.

A Kodak Approval XP4 printer was used to image a proof at the Specification for Web Offset Printing (SWOP) conditions with cyan status T density at approximately 1.30 density absolute on Textweb paper. Imaging cyan at a different exposure to obtain a cyan color of 1.0 density would result in a screened image representing another cyan ink that could be used in the printing process. FIG. 24 shows that the required exposure to obtain a 1.0 cyan density is about 155 mJ/cm$^2$ and is well within the capability of the cyan donor. This would be a case where the recipe color is composed of a single colorant.

For some instances of recipe colors, such as text, the underlying image is not printed. In this case there would be no process color under the recipe color. This means that no cyan, magenta, yellow, or black colorant has been used from the original color donors. In these cases the exposure may be changed, and the recipe color component imaged utilizing the same donor sheet used to image the process color plane.

For some applications, such as text, or large solid areas of color, the process colors and recipe colors overlap. This is performed so that if the plates on the printing press are slightly out of alignment a white space error is not created. The Kodak Approval halftone color proofer utilizes approximately 30% of the colorant in the dye donors to image a process color. This leaves sufficient colorant in the dye donor to be used for an additional recipe color pass using the same dye donor sheet. When the recipe color overlaps a process color there will be a significant change in color which allows the customer to clearly judge the trapping in the halftone proof.

In the present invention, millions of recipe colors are available to choose from. Plus there are multiple combinations of process colors which will result in visually similar colors. To select a recipe color, the color proofer may be programmed to create a regularly varying grid of recipe colors shown in FIG. 24. This is done by programming the printer to vary the exposure of a first color 800 in the x direction 801. Then the second color 802 is imaged, and superimposed on the first color, by varying the exposure in the y direction 803. The apparatus allows the operator to add a fixed amount of third color 804 on top of the first and second colors 800 and 802. This results, for example, in a twenty by twenty-one grid of color patches where column T is solid second color 802. Row 20 is solid first color 800. Row 21 is solid third color 804. Row 1 Column A through Row 19 Column S are varying amounts of first and second colors with a fixed amount of third color. The customer may select one of these color patches or run additional test images to select her desired recipe color. The customer enters the recipe grid page; the x, y coordinates; or the patch number, to instruct the machine which exposures to use to produce the customer's special color. Additional solid colors may be added on top of the row 1 column A through row 19 column S to create the recipe color. The third color in row 21 may be omitted to create a recipe with only colors 800 and 802.

In addition to imaging the recipe test page, solid patches of each color for each exposure are also created. Solid patches of first color 800 compose row 20. Solid patches of second color 802 compose column T. Solid patches of third color 804 compose row 21. This allows the recipe color to be modeled as a function of the individual colorants. Each recipe test patch is linearly interpolated to estimate the required exposure to obtain a given color with reasonable results. This data base is then used to guide customer's exposure selections to obtain a desired color. The L*,a*,b* color space is used to specify the desired recipe color. This color space is familiar to those skilled in the art and recognized by our customers.

Figure 25:
FIG. 25 simulates a color halftone image.
Figure 26:
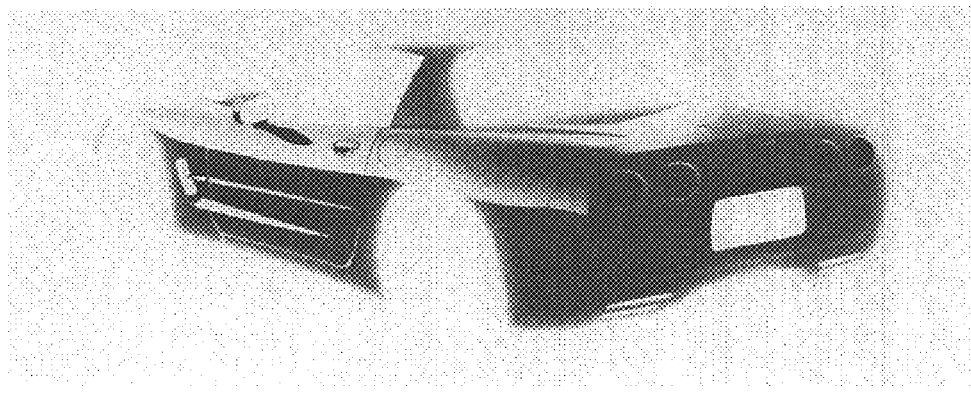
FIG. 26 simulates a color plane using a recipe color according to the present invention.
Figure 27:
FIG. 27 simulates the final image obtained by adding the recipe color plane of FIG. 26 to FIG. 25.

FIGS. 25–27 show an example of a recipe color, or specialty color, used to simulate a bump plate in printing. In FIG. 25 a car has been imaged however, the color of the car does not match the actual color of the subject. A bump plate shown in FIG. 26 is prepared as a separate color plane according to the present invention and imaged over the halftone image in FIG. 25 to create the finished product shown in FIG. 27.

One skilled in the art will recognize that the number of patches in the recipe test image is not significant. One skilled in the art will also recognize that this same test image may be used with cyan, magenta, yellow, black, silver, orange, green, pink, light cyan, or any other available colorant. One skilled in the art will recognize that colorants from the same family of products do not need to be used. For example, pigmented donor may be used with other pigmented donors, or in combination with dye donor.

One skilled in the art will recognize that a recipe color page consisting of three or more colors maybe created. For instance four images consisting of four rows by four columns maybe created where colors, 1, 2, and 3 have four levels each.

The invention has been described in detail with particular reference to certain preferred embodiments thereof, but it will be understood that variations and modifications can be effected within the scope of the invention. While our example uses process colors in combination with one recipe color, multiple recipe colors may be added to a single image or combination of images. While our example uses process colors, the customer image may consist of multiple recipe colors, or just one recipe color, or a combination of recipe colors with process colors. Although the invention has been described using CMYK to create recipe colors, special donors such as green, pink, orange, light cyan, or silver may be used to create a distinct recipe color. Those skilled in the art will recognize that other colors that may be desirable to form the basis for a recipe color. Although the term dye donor has been used throughout the specification, the invention is intended to cover pigmented donor sheets, colored wax donor sheets, and other color transfer means.

PARTS LIST

- 10. Image processing apparatus
- 12. Image processor housing
- 14. Image processor door
- 16. Ejection chute
- 18. Waste bin
- 20. Media stop
- 32. Thermal print media
- 34. Dye donor roll material
- 36. Dye donor sheet
- 50a. Lower sheet material tray
- 50b. Upper sheet material tray
- 52a. Lower media lift cam
- 52b. Upper media lift cam
- 54a. Lower media roller
- 54b. Upper media roller
- 56. Media guide
- 58. Media guide rollers
- 60. Media staging tray
- 80. Transport mechanism
- 100. Media carousel
- 110. Media drive mechanism
- 112. Media drive rollers
- 120. Media knife assembly
- 122. Media knife blades
- 180. Color binding assembly
- 182. Media entrance door
- 184. Media exit door
- 202. Lathe bed scanning frame
- 204. Entrance passageway
- 300. Vacuum imaging drum
- 302. Kodak Corporate Logo
- 320. Recipe color plane
- 330. Magenta pass
- 340. Light yellow pass
- 360. Grid
- 370. Recipe color plane
- 380. Light magenta pass
- 390. Medium yellow pass
- 400. Laser assembly
- 402. Kodak Red
- 403. Laser diodes
- 404. Fiber optic cables
- 406. Distribution block
- 410. Kodak Yellow
- 440. Darker outline
- 450. White space error
- 500. Printhead
- 501. Customer image
- 505. Scanner
- 510. Digital file
- 515. Digital camera
- 520. Thermal printer
- 530. Color ink jet printer
- 540. Personal computer
- 541. Black bitmap file
- 542. Yellow bitmap file
- 543. Magenta bitmap file
- 544. Cyan bitmap file
- 545. Special color bitmap file
- 546. Recipe color bitmap
- 550. Color digital proofer
- 560. Black printing plate
- 561. Yellow printing plate
- 562. Magenta printing plate
- 563. Cyan printing plate
- 564. Special color printing plate
- 612. Axis
- 614. Drum frame member
- 616. Movable writing head assembly
- 620. Translator member -continued

PARTS LIST

- 622. Bar
- 624. Bar
- 626. Lead screw
- 630. Cyan plane
- 631. Halftone dots
- 632. Micropixels
- 640. Magenta plane
- 650. Yellow plane
- 660. Black plane
- 670. Grid
- 680. Plane
- 690. Magenta pass
- 700. Yellow pass
- 800. First color
- 801. x direction
- 802. Second color
- 803. y direction
- 804. Third color

What is claimed is:

1. An apparatus for printing halftone recipe color images comprising:

a printhead;

wherein said printhead is adapted to print a first color at a first intensity;

wherein said printhead is adapted to print a second color at a second intensity;

wherein said first and said second colors are superimposed and coextensive; and wherein said printhead prints to a thermal media by transferring dye from a dye donor sheet.

2. An apparatus as in claim 1 wherein said dye donor sheet and said thermal media are mounted on a vacuum imaging drum.

3. An apparatus as in claim 1;

wherein said printer is adapted to print a third color at a third intensity; and wherein said third color is superimposed on said first color and said second color and coextensive with said first color and said second color.

4. An apparatus as in claim 1 wherein said first and said second colors form a first color plane.

5. An apparatus as in claim 1 wherein said first and said second colors create a third color which is distinct from said first and said second color.

6. An apparatus as in claim 1 wherein said first color and said second color comprise a color plane which overlays a color digital halftone image.

7. An apparatus for printing halftone recipe color images comprising:

a printhead;

wherein said printhead is adapted to print a first color at a first intensity;

wherein said printhead is adapted to print a second color at a second intensity;

wherein said first and said second colors are superimposed and coextensive; and wherein said first intensity and said second intensity are varied by adjusting a writing speed of said apparatus.

8. An apparatus as in claim 7 wherein a first dye donor sheet is used to create said first color and a second dye donor sheet is used to create said second color.

9. An apparatus as in claim 7 wherein said printhead is a laser printhead.

10. An apparatus as in claim 7 wherein said recipe color replaces a process color.

11. An apparatus for printing halftone recipe color images comprising:
- a printhead;
- wherein said printhead is adapted to print a first color at a first intensity;
- wherein said printhead is adapted to print a second color at a second intensity;
- wherein said first and said second colors are superimposed and coextensive; and
- wherein said first intensity and said second intensity are varied by adjusting laser power of said printhead.

12. An apparatus for printing halftone recipe color images comprising:
- a printhead;
- wherein said printhead is adapted to print a first color at a first intensity;
- wherein said printhead is adapted to print a second color at a second intensity;
- wherein said first and said second colors are superimposed and coextensive; and
- wherein said first intensity and said second intensity are varied by adjusting a laser duty cycle of said printhead.

13. An apparatus for printing halftone recipe color images comprising:
- a printhead;
- wherein said printhead is adapted to print a first color at a first intensity;
- wherein said printhead is adapted to print a second color at a second intensity;
- wherein said first and said second colors are superimposed and coextensive; and
- wherein said first intensity and said second intensity are varied by changing at least one of a parameter of said printhead selected from a group comprising writing speed, laser power, and laser duty cycle.

14. A process for forming a laser-induced thermal material transfer image having a recipe color plane comprising:
- placing a first dye donor in contact with a thermal print media;
- imagewise-heating said dye donor with a laser;
- transferring a first colorant from said first dye donor to said thermal print media in a first pattern;
- replacing said first dye donor with a second dye donor having a different color from said first dye donor;
- imagewise-heating said second dye donor with said laser; and
- transferring a second colorant in said first pattern that is in register and coextensive with said first colorant.

15. A method for printing halftone recipe color images comprising the steps of:
- mounting a sheet of thermal media on a vacuum imaging drum;
- mounting a first dye donor sheet on said vacuum imaging drum in registration with said thermal media;
- using a laser printhead to transfer dye from said first donor sheet to said thermal media in a first pattern;
- removing said first dye donor sheet, mounting a second dye donor sheet on said vacuum imaging drum in registration with said thermal media;
- using said printhead to create a second pattern by transferring dye from said second dye donor sheet to said thermal media to form a second pattern; and
- wherein said second pattern is coextensive with said first pattern and micro dots, which comprise said first pattern and said second pattern are superimposed.

16. An apparatus for printing halftone recipe color images comprising:
- a printhead;
- wherein said printhead is adapted to print a first pass using a first dye donor sheet to create a first color plane on a receiver comprises of a first color at a first intensity;
- wherein said printhead is adapted to print a second pass using said first dye donor sheet to create a second color plane on said receiver comprised of said first color at a second intensity;
- wherein said printhead is adapted to print a third pass using a second dye donor sheet to print a second color on said second color plane on said receiver at a third intensity; and
- wherein said second pass and said third pass are superimposed and coextensive.

17. An apparatus for printing halftone recipe color images comprising:
- a printhead;
- wherein said printhead is adapted to print a first pass using a first dye donor sheet to create a first color plane on a receiver comprised of a first color at a first intensity;
- wherein said printhead is adapted to print a second pass using a second dye donor sheet to create a second color plane on said receiver comprised of said first color at a second intensity;
- wherein said printhead is adapted to print a third pass using a third dye donor sheet to print a second color on said second color plane on said receiver at a third intensity; and
- wherein said second pass and said third pass are superimposed and coextensive.

18. A laser thermal printer improvements therein comprising:
- a printhead;
- wherein said printhead is adapted to print a first pass using a first dye donor sheet to create a first color plane on a receiver comprised of a first color at a first intensity;
- wherein said printhead is adapted to print a second pass using said first dye donor sheet to create a second color plane on said receiver comprised of said first color at a second intensity;
- wherein said printhead is adapted to print a third pass using a second dye donor sheet to print a second color on said second color plane on said receiver at a third intensity; and
- wherein said second pass and said third pass are superimposed and coextensive.

* * * * *